(12) United States Patent
Rezai

(10) Patent No.: US 12,030,242 B2
(45) Date of Patent: Jul. 9, 2024

(54) METHOD OF FABRICATING AN ARTICLE BY FUSED FILAMENT FABRICATION

(71) Applicant: BAE Systems plc, London (GB)

(72) Inventor: Amir Rezai, Bristol (GB)

(73) Assignee: BAE Systems plc, London (GB)

( * ) Notice: Subject to any disclaimer, the term of this patent is extended or adjusted under 35 U.S.C. 154(b) by 213 days.

(21) Appl. No.: 17/780,050

(22) PCT Filed: Nov. 26, 2020

(86) PCT No.: PCT/GB2020/053000
§ 371 (c)(1),
(2) Date: May 26, 2022

(87) PCT Pub. No.: WO2021/105671
PCT Pub. Date: Jun. 3, 2021

(65) Prior Publication Data
US 2022/0410469 A1 Dec. 29, 2022

(30) Foreign Application Priority Data

Nov. 28, 2019 (EP) ..................................... 19275133
Nov. 28, 2019 (GB) ..................................... 1917352

(51) Int. Cl.
*B29C 64/118* (2017.01)
*B29C 64/255* (2017.01)
(Continued)

(52) U.S. Cl.
CPC .......... *B29C 64/118* (2017.08); *B29C 64/255* (2017.08); *B29C 64/321* (2017.08);
(Continued)

(58) Field of Classification Search
None
See application file for complete search history.

(56) References Cited

U.S. PATENT DOCUMENTS

| | | | | |
|---|---|---|---|---|
| 6,027,786 A | * | 2/2000 | Ford | ....................... B29B 15/08 428/137 |
| 2014/0291886 A1 | * | 10/2014 | Mark | ..................... B29C 48/92 264/259 |

(Continued)

FOREIGN PATENT DOCUMENTS

| WO | 2016011252 A1 | 1/2016 |
|---|---|---|
| WO | 2019191678 A1 | 10/2019 |

OTHER PUBLICATIONS

International Preliminary Report on Patentability for PCT Appl. No. PCT/GB2020/053000 mail date Jun. 9, 2022, 9 pages.
(Continued)

*Primary Examiner* — Armand Melendez
(74) *Attorney, Agent, or Firm* — Maine Cernota & Curran

(57) ABSTRACT

A method of fabricating an article by fused filament fabrication. The method comprises providing a filament (3) comprising a first set RF of reinforcement fibres (300), including a first reinforcement fibre (300A), surrounded, at least in part, with a first polymeric composition (30); forming a first discontinuity (310A) of a first set D1 of discontinuities (310) in the first reinforcement fibre (300A); and depositing the filament (3), including the first discontinuity (310A) of the first set D1 of discontinuities (310) formed in the first reinforcement fibre (300A), comprising softening, at least in part, the first polymeric composition (30) and solidifying the softened first polymeric composition (30); wherein depositing the filament (3), including the first discontinuity (310A) of the first set D1 of discontinuities (310) formed in the first reinforcement fibre 300A, comprises depositing the filament (30), including the first discontinuity (310A) of the first set D1 of discontinuities (310) formed in the first reinforcement fibre (300A), in a first arc (320) of a set of arcs A.

17 Claims, 6 Drawing Sheets

(51) Int. Cl.
    *B29C 64/321*     (2017.01)
    *B33Y 10/00*     (2015.01)
    *B33Y 70/00*     (2020.01)
    *B29K 105/12*     (2006.01)

(52) U.S. Cl.
    CPC .............. *B33Y 10/00* (2014.12); *B33Y 70/00* (2014.12); *B29K 2105/12* (2013.01); *B29K 2995/0094* (2013.01)

(56) References Cited

U.S. PATENT DOCUMENTS

2019/0224911 A1*   7/2019   Shuck .................... B33Y 80/00
2022/0145047 A1*   5/2022   Ishida .................... C08L 61/02

OTHER PUBLICATIONS

Extended European Search Report for EP Appl. No. 19275133.7 mail date Jun. 8, 2020, 8 pages.
United Kingdom Search Report for GB Appl. No. GB1917352.5 mail date Sep. 7, 2020, 3 pages.
International Search Report and Written Opinion for PCT Appl. No. PCT/GB2020/053000 mail date Jan. 29, 2021, 13 pages.

* cited by examiner

METHOD OF FABRICATING AN ARTICLE BY FUSED FILAMENT FABRICATION

RELATED APPLICATIONS

This application is a national phase application filed under 35 USC § 371 of PCT Application No. PCT/GB2020/053000 with an International filing date of Nov. 26, 2020, which claims priority of GB Patent Application 1917352.5 filed on Nov. 28, 2019 and EP Patent Application 19275133.7 filed on Nov. 28, 2019. Each of these applications is herein incorporated by reference in its entirety for all purposes.

FIELD

The present invention relates to methods of providing filaments for fused filament fabrication, filaments for fused filament fabrication, fabricating articles by fused filament fabrication and articles fabricated by fused filament fabrication.

BACKGROUND TO THE INVENTION

Fused filament fabrication, FFF, (also known as fused deposition modelling, FDM), is an additive manufacturing (also known as 3D printing) process that uses a continuous filament of polymeric material, typically a thermoplastic material. The filament (also known as feedstock) is fed from a spool through a nozzle of a moveable, heated printer head, whereupon a part of the filament is heated, thereby generally melting the solid filament, and molten filament deposited by extrusion on a substrate whereupon the molten filament solidifies. The head is moved under computer control, typically according to a STL file (STereoLithography file format), to fabricate the printed article. Usually, the head moves in two dimensions to deposit one horizontal plane, or layer, at a time; the article or the head is then moved vertically by a small amount to begin a new layer above the previously deposited layer. The nozzle typically has a diameter in a range from 0.3 mm to 1.0 mm—a thickness of the deposited layer is similar. In this way, articles having complex shapes in three dimensions may be fabricated.

Suitable polymeric materials for FFF include acrylonitrile butadiene styrene (ABS), polylactic acid (PLA), polycarbonate (PC), polyamide (PA), polystyrene (PS), high-density polyethylene (HDPE), PC/ABS, polyethylene terephthalate (PETG), polyphenylsulfone (PPSU), high impact polystyrene (HIPS), polytetrafluoroethylene (PTFE), lignin and rubber. Polyaryletherketones (PAEKs), such as polyetherketoneketone (PEKK), polyetheretherketone (PEEK) and polyetherimide (PEI), may also be suitable for FFF, for example for high performance structural applications.

Where improved mechanical properties are required, reinforcement fibres, such as carbon fibre and/or glass fibre, may be included in the filament. These reinforcement fibres typically have relatively high tensile strengths and/or stiffnesses (i.e. Young's modulus). These reinforcement fibres are not melted during FFF. The proportion (also known as volume fraction) of fibres tends to dominate the mechanical properties and higher proportions of fibre content are required to achieve the most desirable specific strength or stiffness values. Advanced fibre reinforced polymer matrix composite laminates are typically designed with a fibre volume fraction $V_f$ of approximately 50-60%. However, the volume fraction $V_f$ of the continuous reinforcement fibres in the filament is limited because of a number of processing issues/restrictions. Higher volume fractions of continuous fibre in FFF restrict and constrain the movement and manipulation of the molten filament. This results in poor consolidation between layers, and seriously compromises the resolution and dimensional accuracy of the printed part. Additionally, fibres tend to pull out of the molten polymeric material during FFF, for example sideways when depositing a relatively tight arc within a layer and/or vertically when moving from a previously-deposited layer to a new layer thereabove. Thus, the achievable mechanical properties of the article fabricated by FFF are moderated by the limited volume fraction $V_f$ of the reinforcement fibres included in the filament, limiting application of FFF.

Hence, there is a need to improve FFF, for fabrication of articles, having complex shapes in three dimensions, having improved mechanical properties.

SUMMARY OF THE INVENTION

It is one aim of the present invention, amongst others, to provide a filament, and a method of providing a filament, for fused filament fabrication which at least partially obviates or mitigates at least some of the disadvantages of the prior art, whether identified herein or elsewhere.

A first aspect provides a method of providing a filament for fused filament fabrication, the method comprising:
  arranging a first set of reinforcement fibres, including a first reinforcement fibre; forming a first discontinuity of a first set of discontinuities in the first reinforcement fibre; and
  surrounding the first set of reinforcement fibres, at least in part, with a first polymeric composition, thereby providing the filament.

A second aspect provides a filament for fused filament fabrication, the filament comprising:
  a first set of reinforcement fibres, including a first reinforcement fibre, surrounded, at least in part, with a first polymeric composition;
  wherein the first reinforcement fibre comprises a first discontinuity of a first set of discontinuities therein.

A third aspect provides a method of fabricating an article by fused filament fabrication using a filament provided according to the first aspect and/or according to the second aspect, the method comprising:
  depositing the filament comprising softening, at least in part, the first polymeric composition and solidifying the softened first polymeric composition;
  wherein depositing the filament comprises depositing the filament in an arc having a radius in a range from 0.5 mm to 20 mm.

A fourth aspect provides an article fabricated according to the method of the third aspect and/or the seventh aspect.

A fifth aspect provides an apparatus for fused filament fabrication of an article using a filament comprising a first set of reinforcement fibres including a first reinforcement fibre, the apparatus comprising:
  a printer head including a nozzle; and
  means for forming a first discontinuity of a first set of discontinuities in the first reinforcement fibre.

A sixth aspect provides an STL file for fused filament fabrication of an article using a filament comprising a first set of reinforcement fibres including a first reinforcement fibre, the STL file comprising:
  a position of a first discontinuity of a first set of discontinuities to be formed in the first reinforcement fibre.

A seventh aspect provides a method of fabricating an article by fused filament fabrication, the method comprising:

providing a filament comprising a first set of reinforcement fibres, including a first reinforcement fibre, surrounded, at least in part, with a first polymeric composition;

forming a first discontinuity of a first set of discontinuities in the first reinforcement fibre; and depositing the filament, including the first discontinuity of the first set of discontinuities formed in the first reinforcement fibre, comprising softening, at least in part, the first polymeric composition and solidifying the softened first polymeric composition;

wherein depositing the filament, including the first discontinuity of the first set of discontinuities formed in the first reinforcement fibre, comprises depositing the filament, including the first discontinuity of the first set of discontinuities formed in the first reinforcement fibre, in a first arc of a set of arcs.

DETAILED DESCRIPTION OF THE INVENTION

According to the present invention there is provided a method of providing a filament, as set forth in the appended claims. Also provided is filament, a method of fabricating an article using such a filament and an article fabricated using such a method. Other features of the invention will be apparent from the dependent claims, and the description that follows.

Method of Providing a Filament

The first aspect provides a method of providing a filament for fused filament fabrication, the method comprising:

arranging a first set of reinforcement fibres, including a first reinforcement fibre;

forming a first discontinuity of a first set of discontinuities in the first reinforcement fibre; and surrounding the first set of reinforcement fibres, at least in part, with a first polymeric composition, thereby providing the filament.

In this way, a mechanical property, for example a tensile strength and/or a stiffness, of the first set of reinforcement fibres is attenuated due to the first discontinuity of the first set of discontinuities in the first reinforcement fibre. By attenuating the mechanical property of the first set of reinforcement fibres in this way, articles having complex shapes in three dimensions may be fabricated by FFF, since manipulation quality issues and pull out of the first set of reinforcement fibres during FFF is reduced, while the articles have improved mechanical properties due to a relatively higher volume fraction $V_f$ of the first set of reinforcement fibres in the filament than may be included in conventional filaments for FFF.

It should be understood that the filament provided according to the first aspect comprises the first set of reinforcement fibres, wherein the first reinforcement fibre comprises the first discontinuity of the first set of discontinuities, surrounded, at least in part, by the first polymeric composition. It should be understood that the filament provided according to the first aspect is a composite filament, for FFF of composite articles.

Filament

The method is of providing the filament for fused filament fabrication. Typically, filaments for FFF are available having diameters of 1.75 mm and 2.85 mm (nominally 3 mm), on spools having nominally masses of 220 g, 650 g, 900 g, 1 kg, 2.25 kg and/or 5 kg. It should be understood that the masses are net masses i.e. of the filaments. Respective lengths of the filaments on the spools depend on the nominal masses of the spools and respective densities of the filaments. Other diameters, lengths and/or spool masses may be available. In one example, the filament has a diameter in a range from 0.5 mm to 5 mm, preferably in a range from 1 mm to 4 mm, more preferably in a range from 1.5 mm to 3 mm, for example 1.75 mm or 2.85 mm. In one example, the filament is provided on a spool, having a nominal mass in a range from 100 g to 100 kg, preferably in a range from 150 kg to 50 kg, more preferably in a range from 200 g to 10 kg, for example 220 g, 650 g, 900 g, 1 kg, 2.25 kg or 5 kg. In one example, the filament has a length in a range from 10 m to 10 km, preferably in a range from 20 m to 1 km.

Reinforcement Fibres

In one example, the first set of reinforcement fibres comprises non-metal fibres for example glass fibres such as A-glass, E-glass, E-CR-glass, C-glass, D-glass, R-glass, S-glass, S-2-glass and HS-glass; carbon fibres such as aerospace or industrial grades of IM2A, IM2C, IM5, IM6, IM7, IM8, IM9, IM10, AS4, AS4A, AS4C, AS4D, AS7, HM50 and HM63; aramid fibres such as Kevlar®, Nomex® and Technora®; Ultra-High Molecular Weight Polyethylene (UHMwPE) fibres such as Dyneema®; and/or mixtures thereof. In one example, the first set of reinforcement fibres comprises metal and/or alloy fibres for example titanium, aluminium and/or copper and/or alloys thereof; stainless steel fibres; and/or mixtures thereof. In one example, the first set of reinforcement fibres comprises a mixture of non-metal and metal fibres.

In one example, the first reinforcement fibre has a diameter in a range from 2 μm to 100 μm, preferably in a range from 4 μm to 50 μm, more preferably in a range from 5 μm to 20 μm, most preferably in a range from 6 μm to 10 μm, for example 6 μm, 7 μm, 8 μm, 9 μm or 10 μm. Typically, suitable carbon fibres have a diameter in a range from 7 μm to 10 μm and suitable glass fibres have a diameter in a range from 4 μm to 20 μm.

In one example, a volume fraction $V_f$ of the first set of reinforcement fibres is in a range from 10% to 70%, preferably in a range from 20% to 60%, for example 30%, 40% or 50%, by volume of the filament. In this way, a relatively high volume fraction $V_f$ of the first set of reinforcement fibres in the filament may be provided, thereby increasing the mechanical property of the filament and enabling FFF of articles having improved mechanical properties.

In one example, a volume fraction $V_{f,pristine}$ of pristine fibres of the first set of reinforcement fibres is in a range from 5% to 30%, preferably in a range from 10% to 25%, for example 15%, 17.5% or 20%, by volume of the filament. It should be understood that the volume fraction $V_{f,pristine}$ of pristine fibres is the volume fraction of continuous fibres of the first set of reinforcement fibres i.e. fibres not comprising discontinuities therein. In this way, the volume fraction $V_{f,pristine}$ of pristine fibres of the first set of reinforcement fibres in the filament may tend towards the limit for conventional filaments including reinforcement fibres while having a relatively high volume fraction $V_f$ of the first set of reinforcement fibres, thereby allowing articles having complex shapes in three dimensions to be fabricated by FFF due to the relatively lower volume fraction $V_{f,pristine}$ of fibres of the first set of reinforcement fibres, while the articles have improved mechanical properties due to the relatively higher volume fraction $V_f$ of the first set of reinforcement fibres in the filament.

In one example, the first reinforcement fibre has a length L greater than or equal to a critical length $l_c$ of the first reinforcement fibre in the filament, preferably wherein $L>3l_c$, more preferably wherein $L>5l_c$, most preferably wherein $L>7l_c$. The minimum length is controlled to be above the critical length $l_c$ for the composite so that efficient load transfer into the fibre occurs. The critical length $l_c$ of the first reinforcement fibre in the filament is directly proportional to a diameter of the first reinforcement fibre and a strength of the first reinforcement fibre and inversely proportional to an interfacial shear strength between the first reinforcement fibre and the first polymeric composition (i.e. the matrix).

In one example, the first reinforcement fibre has a length of at least 2 mm, preferably at least 10 cm, more preferably at least 1 m, most preferably at least 10 m. It should be understood that the length of the first reinforcement fibre is a total length of the first reinforcement fibre i.e. including discontinuities therein. That is, the first reinforcement fibre comprises and/or is a continuous fibre. In contrast, chopped fibres typically have lengths less than 3 mm and tend to be arranged randomly or less than perfectly aligned. In one example, the first reinforcement fibre has a length corresponding with, for example equal to, a length of the filament. In this way, a mechanical property of the filament and hence an article fabricated by FFF therefrom is improved.

In one example, the first set of reinforcement fibres includes a second reinforcement fibre and the method comprises forming a first discontinuity of a second set of discontinuities in the second reinforcement fibre, wherein the first discontinuity of the first set of discontinuities and the first discontinuity of the second set of discontinuities are mutually spaced apart axially. That is, respective discontinuities in the first reinforcement fibre and in the second reinforcement fibre are axially offset. In this way, a stiffness of the first set of reinforcement fibres is attenuated, allowing deposition of the filament during FFF in a relatively tight arc without pull out of the first set of reinforcement fibres, while a mechanical property of the article fabricated by FFF therefrom is better maintained. In contrast, if the first discontinuity of the first set of discontinuities and the first discontinuity of the second set of discontinuities were axially aligned, while the stiffness of the first set of reinforcement fibres is attenuated, the mechanical property of the article fabricated by FFF therefrom may be compromised due to the axial alignment of the respective discontinuities. The second reinforcement fibre may be as described with respect to the first reinforcement fibre.

Arranging Reinforcement Fibres

The method comprises arranging the first set of reinforcement fibres, including the first reinforcement fibre.

In one example, arranging the first set of reinforcement fibres comprises mutually axially aligning the first set of reinforcement fibres. For example, the first set of reinforcement fibres may be provided as a fibre tow or as a yarn. That is, respective fibres of the first set of reinforcement fibres are macroscopically mutually axially aligned, for example along a length of the first set of reinforcement fibres, while local or microscopic deviations in mutual alignment may be present, as understood by the skilled person.

In one example, arranging the first set of reinforcement fibres comprises arranging the first set of reinforcement fibres in a planar arrangement. For example, the first set of reinforcement fibres may be arranged as a thin ply, for example by automated fibre placement (AFP), such as comprising N layers of the reinforcement fibres of the first set of reinforcement fibres where N is a natural number greater than or equal to 1, for example 1, 2, 3, 4, 5, 6, 7, 8, 9, 10 or more. Methods of arranging fibres as thin plies are known. In one example, a width of the first set of reinforcement fibres is in a range from 1 mm to 10 mm, preferably in a range from 2 mm to 8 mm, for example 2 mm, 3 mm, 4 mm, 5 mm, 6 mm, 7 mm or 8 mm. In one example, a width of the first set of reinforcement fibres is determined, at least in part, by a number of N layers of the reinforcement fibres of the first set of reinforcement fibres and a desired volume fraction $V_f$ of the first set of reinforcement fibres in the filament.

In one example, arranging the first set of reinforcement fibres comprises arranging the first set of reinforcement fibres in a non-planar arrangement, for example a tubular or a cylindrical arrangement. For example, the first set of reinforcement fibres may be arranged as a bundle. Methods of arranging fibres as bundles are known. In one example, a diameter of the first set of reinforcement fibres is in a range from 1 mm to 10 mm, preferably in a range from 2 mm to 8 mm, for example 2 mm, 3 mm, 4 mm, 5 mm, 6 mm, 7 mm or 8 mm.

In one example, arranging the first set of reinforcement fibres comprises arranging the first set of reinforcement fibres in a jig. In one example, arranging the first set of reinforcement fibres comprises bonding the first set of reinforcement fibres, for example using a resin such as in a pre-impregnated (i.e. a pre-preg) thin ply and/or cross-stitching the first set of reinforcement fibres. In this way, an arrangement of the first set of reinforcement fibres may be maintained, for example during forming the first discontinuity of the first set of discontinuities in the first reinforcement fibre. In one example, arranging the first set of reinforcement fibres comprises obtaining a pre-impregnated (i.e. a pre-preg) thin ply and dividing the thin ply axially, thereby providing the first set of reinforcement fibres.

Forming Discontinuities in Reinforcement Fibres

The method comprises forming the first discontinuity of the first set of discontinuities in the first reinforcement fibre. It should be understood that the first discontinuity of the first set of discontinuities comprises and/or is a reduction in cross-sectional area and/or diameter of the first reinforcement fibre. Thus, the first discontinuity may be a partial discontinuity, corresponding with a partial reduction in cross-sectional area and/or diameter of the first reinforcement fibre. Alternatively, the first discontinuity may be a full discontinuity, corresponding with parting (i.e. severing) the first reinforcement fibre. In one example, the first discontinuity of the first set of discontinuities in the first reinforcement fibre comprises and/or is a partial discontinuity, wherein a reduction in cross-sectional area and/or diameter of the first reinforcement fibre is in a range from 10% to 90%, preferably in a range from 25% to 75%. In one example, the first discontinuity of the first set of discontinuities in the first reinforcement fibre comprises and/or is a full discontinuity.

In one example, forming the first discontinuity comprises transversely parting, at least in part, the first reinforcement fibre, for example wherein a reduction in cross-sectional area and/or diameter of the first reinforcement fibre is in a range from 10% to 100%, preferably in a range from 25% to 75%. In one example, forming the first discontinuity comprises transversely fully parting the first reinforcement fibre.

In one example, forming the first discontinuity comprises laser ablating, cutting, punching and/or water jetting, at least in part, the first reinforcement fibre. More generally, in one example, forming the first discontinuity comprises thermally (for example, laser ablating) and/or mechanically (for example cutting, punching and/or water jetting) parting, at least in part, the first reinforcement fibre.

Methods of laser ablating reinforcement fibres are known. Nanosecond-pulsed UV laser sources are suitable for parting carbon and glass fibres, for example, achieving good quality ablated surfaces without introducing heat damage. Other laser sources are known. In one example, a laser spot size corresponds with a diameter of the first reinforcement fibre.

In one example, forming the first discontinuity of the first set of discontinuities in the first reinforcement fibre comprises providing square and/or tapering ends of the first reinforcement fibre at the first discontinuity therein. In this way, fibre mobility is improved, allowing relatively tight arcs to be deposited during FFF. In contrast, bulbous ends (i.e. comprising protrusions) of the first reinforcement fibre at the first discontinuity therein reduce fibre mobility by keying better to the melted first polymeric composition, resulting in pull out of the first reinforcement fibre during deposition of such relatively tight arcs.

In one example, forming the first discontinuity comprises forming the first discontinuity at a first predetermined position. In this way, the position of the first discontinuity may correspond with a relatively tight arc to be deposited during FFF.

In one example, the method comprises forming a second discontinuity of the first set of discontinuities in the first reinforcement fibre, for example spaced apart axially from the first discontinuity by a spacing S. That is, the spacing S is a continuous length (i.e. not including any discontinuities) of the first reinforcement fibre between the first discontinuity and the second discontinuity therein. In one example, the spacing S is greater than or equal to a critical length $l_c$ of the first reinforcement fibre in the filament, preferably wherein $S>3l_c$, more preferably wherein $S>5l_c$, most preferably wherein $S>7l_c$. For example, for carbon fibres, the spacing S between the first discontinuity and the second discontinuity may be as low as 2 mm (for improved flexibility), equating to about $4l_c$. Preferably, the spacing S between the first discontinuity and the second discontinuity is greater than about $4l_c$. However, there is only marginal benefit by comparing average fibre length in a range of 50 to 500 mm or above.

Rearranging Reinforcement Fibres

In one example, the method comprises rearranging the first set of reinforcement fibres before surrounding the first set of reinforcement fibres, at least in part, with the first polymeric composition. For example, if arranging the first set of reinforcement fibres comprises arranging the first set of reinforcement fibres in a planar arrangement before forming the first discontinuity of the first set of discontinuities in the first reinforcement fibre, the planar arrangement may be subsequently rearranged into a tubular or a cylindrical arrangement. In one example, rearranging the first set of reinforcement fibres comprises arranging the first set of reinforcement fibres in a tubular or a cylindrical arrangement. For example, if arranging the first set of reinforcement fibres comprises arranging the first set of reinforcement fibres in a tubular or a cylindrical arrangement before forming the first discontinuity of the first set of discontinuities in the first reinforcement fibre, the tubular or the cylindrical arrangement may be subsequently rearranged into a planar arrangement. In one example, rearranging the first set of reinforcement fibres comprises arranging the first set of reinforcement fibres in a planar form.

Polymeric Composition

In one example, the first polymeric composition comprises a first thermoplastic, selected from a group comprising acrylonitrile butadiene styrene (ABS), polylactic acid (PLA), polycarbonate (PC), polyamide (PA), polystyrene (PS), high-density polyethylene (HDPE), PC/ABS, polyethylene terephthalate (PETG), polyphenylsulfone (PPSU), high impact polystyrene (HIPS), polytetrafluoroethylene (PTFE), lignin, rubber, and/or a polyaryletherketone (PAEK), such as polyetherketoneketone (PEKK), polyetheretherketone (PEEK) and polyetherimide (PEI). In one example, the first thermoplastic comprises, consists of and/or is PEKK, PEEK and/or PEI, preferably PEKK and/or PEEK, more preferably PEKK. Compared with PEEK, a PEKK is more robust (i.e. less sensitive) to cooling rate during FFF, due, at least in part, to a wider range of acceptable crystallinity. In one example, the first polymeric composition comprises a reactive thermoplastic resin, such as Elium®. Elium is a liquid monomer that may be processed like a thermoset but upon reaction, transforms into a thermoplastic which may be subsequently thermoformed, melted and/or welded. Anionic polymerization of caprolactam (a monomer of polyamide-6, PA-6) is also suitable. Generally, reactive thermoplastic resins may be cured during and/or after FFF, for example by heating and/or using a catalyst included in the first polymeric composition, thereby reacting molecules thereof to provide a thermoplastic having improved mechanical properties. In one example, the first polymeric composition comprises a thermoset. Thermoset 3D printers are available from Magnum Venus Products (Knoxville, TN) and Continuous Composites (https://www.continuouscomposites.com/).

In one example, the first polymeric composition comprises a second thermoplastic, as described above with respect to the first thermoplastic (i.e. a copolymer).

In one example, surrounding the first set of reinforcement fibres, at least in part, with the first polymeric composition comprise surrounding the first set of reinforcement fibres, at least in part, with a second polymeric composition, as described above with respect to the first polymeric composition. For example, the first set of reinforcement fibres may be provided as a pre-preg and subsequently surrounded, at least in part, by the second polymeric composition, thereby providing the filament. For example, the first set of reinforcement fibres may be surrounded, at least in part, by the first polymeric composition, and subsequently, surrounded, at least in part, by the second polymeric composition (i.e. a coating, a sheath), thereby providing the filament.

Surrounding Reinforcement Fibres

The method comprises surrounding the first set of reinforcement fibres, at least in part, with the first polymeric composition, thereby providing the filament. In one example, the method comprises completely surrounding the first set of reinforcement fibres with the first polymeric composition. In one example, surrounding the first set of reinforcement fibres, at least in part, with the first polymeric composition comprises surrounding the first reinforcement fibre, at least in part and preferably completely, with the first polymeric composition. In one example, surrounding the first set of reinforcement fibres, at least in part, with the first polymeric composition comprises surrounding each of the first set of reinforcement fibres, at least in part and preferably completely, with the first polymeric composition.

In one example, surrounding the first set of reinforcement fibres, at least in part, with the first polymeric composition is by pultrusion. Forming filaments comprising reinforcement fibres is known.

In one example, the method comprises surrounding the first set of reinforcement fibres, at least in part, with the first polymeric composition after forming the first discontinuity of the first set of discontinuities in the first reinforcement fibre. That is, the first discontinuity of the first set of discontinuities is formed in the first reinforcement fibre and the first set of reinforcement fibres, including the first reinforcement fibre comprising the first discontinuity of the first set of discontinuities, is subsequently surrounded, at least in part, with the first polymeric composition. In this way, discontinuities in the first set of reinforcement fibres may be formed in predetermined positions therein and/or a flexibility, accuracy and/or precision of forming the discontinuities may be improved.

In one example, the method comprises surrounding the first set of reinforcement fibres, at least in part, with the first polymeric composition before forming the first discontinuity of the first set of discontinuities in the first reinforcement fibre. That is, the first set of reinforcement fibres, including the first reinforcement fibre not comprising the first discontinuity of the first set of discontinuities, is surrounded, at least in part, with the first polymeric composition and subsequently, the first discontinuity of the first set of discontinuities is formed in the first reinforcement fibre surrounded, at least in part, with the first polymeric composition. In this way, the filament may be provided from a conventional filament comprising reinforcement fibres by forming the first discontinuity of the first set of discontinuities in the first reinforcement fibre in situ in the conventional filament. Furthermore, the first polymeric composition surrounding, at least in part, the first set of reinforcement fibres maintains relative positions of the respective fibres of the first set of reinforcement fibres while forming the first discontinuity of the first set of discontinuities in the first reinforcement fibre.

Preferably before the filament is laid down in the deposition step, the filament is pultruded, thus allowing the first polymeric composition to flow into any cavities that have been created when the discontinuities were formed (for example by laser ablating the filament), thus consolidating the filament.

Preferred Example

In one preferred example, the method comprises:
arranging a first set of reinforcement fibres, including a first reinforcement fibre; forming a first discontinuity of a first set of discontinuities in the first reinforcement fibre; and
surrounding the first set of reinforcement fibres, at least in part, with a first polymeric composition, thereby providing the filament;
wherein the first polymeric composition comprises a first thermoplastic wherein the first thermoplastic comprises, consists of and/or is PEKK, PEEK and/or PEI, preferably PEKK and/or PEEK, more preferably PEKK;
wherein, the first set of reinforcement fibres comprises carbon fibres such as aerospace grades of IM2A, IM2C, IM5, IM6, IM7, IM8, IM9 or IM10, preferably IM7;
wherein the first reinforcement fibre has a diameter in a range from 5 µm to 10 µm;
wherein a volume fraction $V_f$ of the first set of reinforcement fibres is in a range from 10% to 70%, preferably in a range from 20% to 65%, for example 30%, 40% or 50%, by volume of the filament;
optionally wherein a volume fraction $V_{f,pristine}$ of pristine fibres of the first set of reinforcement fibres is in a range from 5% to 30%, preferably in a range from 10% to 25%, for example 15%, 17.5% or 20%, by volume of the filament;
wherein the first reinforcement fibre has a length corresponding with, for example equal to, a length of the filament;
wherein the first set of reinforcement fibres includes a second reinforcement fibre and the method comprises forming a first discontinuity of a second set of discontinuities in the second reinforcement fibre, wherein the first discontinuity of the first set of discontinuities and the first discontinuity of the second set of discontinuities are mutually spaced apart axially;
wherein arranging the first set of reinforcement fibres comprises obtaining a pre-impregnated thin ply and dividing the thin ply axially, thereby providing the first set of reinforcement fibres; wherein forming the first discontinuity comprises transversely parting, at least in part, the first reinforcement fibre, wherein a reduction in cross-sectional area and/or diameter of the first reinforcement fibre is in a range from 10% to 100%, preferably in a range from 25% to 75%; wherein forming the first discontinuity comprises laser ablating the first reinforcement fibre;
wherein forming the first discontinuity of the first set of discontinuities in the first reinforcement fibre comprises providing square and/or tapering ends of the first reinforcement fibre at the first discontinuity therein;
wherein forming the first discontinuity comprises forming the first discontinuity at a first predetermined position;
wherein the method comprises forming a second discontinuity of the first set of discontinuities in the first reinforcement fibre, spaced apart axially from the first discontinuity by a spacing L, wherein $L>3l_c$, more preferably wherein $L>5l_c$, most preferably wherein $L>7l_c$;
wherein the method comprises rearranging the first set of reinforcement fibres before surrounding the first set of reinforcement fibres, at least in part, with the first polymeric composition, wherein rearranging the first set of reinforcement fibres comprises arranging the first set of reinforcement fibres in a tubular or a cylindrical arrangement;
wherein surrounding the first set of reinforcement fibres, at least in part, with the first polymeric composition comprises surrounding each of the first set of reinforcement fibres, at least in part and preferably completely, with the first polymeric composition;
wherein surrounding the first set of reinforcement fibres, at least in part, with the first polymeric composition is by pultrusion; and
wherein the method comprises surrounding the first set of reinforcement fibres, at least in part, with the first polymeric composition after forming the first discontinuity of the first set of discontinuities in the first reinforcement fibre.

Filament

The second aspect provides a filament for fused filament fabrication, the filament comprising:
a first set of reinforcement fibres, including a first reinforcement fibre, surrounded, at least in part, with a first polymeric composition;
wherein the first reinforcement fibre comprises a first discontinuity of a first set of discontinuities therein.

The filament, the first set of reinforcement fibres, the first reinforcement fibre, the first polymeric composition, and/or the first discontinuity of the first set of discontinuities may be as described with respect to the first aspect.

In one example, the filament is provided according to the first aspect.

Method of Fabricating an Article

The third aspect provides a method of fabricating an article by fused filament fabrication using a filament provided according to the first aspect and/or according to the second aspect, the method comprising:
depositing the filament comprising softening, at least in part, the first polymeric composition and solidifying the softened first polymeric composition;
wherein depositing the filament comprises depositing the filament in an arc having a radius in a range from 0.5 to 20 mm.

The method may include any of the steps described herein.

In one example, softening, at least in part, the first polymeric composition comprises melting, at least in part, the first polymeric composition, for example comprising a first thermoplastic.

In one example, solidifying the softened first polymeric composition comprises curing, at least in part, the softened first polymeric composition.

In one example, the method comprises forming the first discontinuity of the first set of discontinuities in the first reinforcement fibre in situ during the FFM, for example while the filament is being fed from the spool to the nozzle. For example, the filament may be provided from a conventional filament comprising reinforcement fibres by forming the first discontinuity of the first set of discontinuities in the first reinforcement fibre in situ in the conventional filament, as described with respect to the first aspect. That is, the discontinuities may be formed inline, during the FFF.

In other words, the third aspect may additionally and/or alternatively provide a method of fabricating an article by fused filament fabrication using a filament comprising a first set of reinforcement fibres, surrounded, at least in part, by a first polymeric composition, the method comprising:
(a) feeding the filament, for example from a spool thereof;
(b) forming a first discontinuity of a first set of discontinuities in the first reinforcement fibre, for example while feeding the filament; and
(c) depositing the filament comprising softening, at least in part, the first polymeric composition and solidifying the softened first polymeric composition;
wherein depositing the filament comprises depositing the filament in an arc having a radius in a range from 0.5 mm to 20 mm.

In this way, a position of the first discontinuity may correspond with the arc to be deposited during FFF, for example as determined from a STL file. In one example, respective positions of the first set of discontinuities, for example arranged in staggered positions, correspond with the arc to be deposited during FFF, for example as determined from a STL file.

Preferably between steps (b) and (c) (i.e. before the filament is laid down in the deposition step), the filament is pultruded. The pressure affect forces the molten polymeric composition into any cavities that have been created in the filament during step (b). A consistent cross-section of filament emerges and is then laid down in the 3D printing process.

In one example, the article comprises and/or is an aircraft, an aerospace, a land craft or a sea craft component.

Article

The fourth aspect provides an article fabricated according to the method of the third aspect.

The article may be as described with respect to the first aspect, the second aspect and/or the third aspect.

Apparatus

The fifth aspect provides an apparatus for fused filament fabrication of an article using a filament comprising a first set of reinforcement fibres including a first reinforcement fibre, the apparatus comprising:
a printer head including a nozzle; and
means for forming a first discontinuity of a first set of discontinuities in the first reinforcement fibre.

The article, the filament, the first set of reinforcement fibres, the first reinforcement fibre, the forming, the first discontinuity and/or the first set of discontinuities and/or the STL file may be as described with respect to the first aspect, the second aspect, the third aspect and/or the fourth aspect.

In one example, the means for forming the first discontinuity comprises thermal means (for example, laser ablating) and/or mechanical means (for example cutting, punching and/or water jetting).

In one example, the apparatus comprises a controller arranged to control a position of the first discontinuity of the first set of discontinuities in the first reinforcement fibre according to a STL file for FFF of the article.

In one example, the nozzle comprises a pivotable nozzle, pivotable about 1, 2 or 3 mutually orthogonal axes, during FFF. Conventionally, an axis of a nozzle is oriented normally to the substrate. However, by pivoting the nozzle during FFF, pull out of reinforcement fibres may be reduced since a curvature at the nozzle of the reinforcement fibres may be reduced by reducing an angle between the axis of the nozzle and the substrate.

In one example, the apparatus comprises a robot having an end effector including the printer head.

STL File

The sixth aspect provides an STL file for fused filament fabrication of an article using a filament comprising a first set of reinforcement fibres including a first reinforcement fibre, the STL file comprising:
a position of a first discontinuity of a first set of discontinuities to be formed in the first reinforcement fibre.

The article, the filament, the first set of reinforcement fibres, the first reinforcement fibre, the position, the first discontinuity, the first set of discontinuities and/or the STL file may be as described with respect to the first aspect, the second aspect, the third aspect, the fourth aspect and/or the fifth aspect.

Method of Fabricating an Article

The seventh aspect provides a method of fabricating an article by fused filament fabrication, the method comprising:
providing a filament comprising a first set of reinforcement fibres, including a first reinforcement fibre, surrounded, at least in part, with a first polymeric composition;
forming a first discontinuity of a first set of discontinuities in the first reinforcement fibre; and
depositing the filament, including the first discontinuity of the first set of discontinuities formed in the first reinforcement fibre, comprising softening, at least in part, the first polymeric composition and solidifying the softened first polymeric composition;
wherein depositing the filament, including the first discontinuity of the first set of discontinuities formed in the first reinforcement fibre, comprises depositing the filament, including the first discontinuity of the first set of discontinuities formed in the first reinforcement fibre, in a first arc of a set of arcs.

In this way, a position of the first discontinuity formed in the first reinforcement fibre corresponds with a position of the first reinforcement fibre in the first arc deposited during the FFF, for example as determined from a STL file. That is, the first discontinuity is included in the arc, thereby reducing a mechanical property, for example a strength and/or a stiffness, of the first reinforcement fibre, thereby enabling the first reinforcement fibre to be deposited in a relatively tighter arc (i.e. relatively smaller radius) compared with a continuous (i.e. uniform, constant cross-section, intact) first reinforcement fibre. In other words, the first discontinuity in the first reinforcement fibre is formed at a position such that the position is subsequently on a locus of the first arc described by the first reinforcement fibre in the deposited filament.

The article, the fused filament fabrication, the providing, the filament, the first set of reinforcement fibres, the first reinforcement fibre, the surrounding, the first polymeric composition, the forming, the first discontinuity, the first set of discontinuities, the softening, the solidifying, the first arc and/or the set of arcs may be as described with respect to the first aspect, the second aspect, the third aspect, the fourth aspect, the fifth aspect and/or the sixth aspect. The method described with respect to the seventh aspect may include any of the steps described herein, for example as described with respect to the first aspect and/or the third aspect.

In one example, forming the first discontinuity of the first set of discontinuities in the first reinforcement fibre comprises forming the first discontinuity of the first set of discontinuities in the first reinforcement fibre in a first portion (i.e. length) of a set of portions of the filament and depositing the filament, including the first discontinuity of the first set of discontinuities formed in the first reinforcement fibre, in the first arc of the set of arcs comprises depositing the first portion of the filament, including the first discontinuity of the first set of discontinuities formed in the first reinforcement fibre, in the first arc of the set of arcs. In other words, the first discontinuity is formed in the first reinforcement fibre in the first portion of the filament and the first portion of the filament, including the first discontinuity formed in the first reinforcement fibre therein, is deposited in the arc. That is, a position of the first discontinuity is included in the first arc.

In one example, forming the first discontinuity of the first set of discontinuities in the first reinforcement fibre comprises forming the first discontinuity at a first predetermined position in the first reinforcement fibre corresponding to the first arc. In one example, the first predetermined position is determined from a STL file, for example according to a radius of curvature of the first arc, mechanical properties of the first reinforcement fibre and/or the set of reinforcement fibres, mechanical properties of the first polymeric composition and/or mechanical properties of the filament. The mechanical properties of the first polymeric composition are changed during softening and hence the first predetermined positions and/or respective positions of the set of discontinuities may be calculated, at least in part, according to the mechanical properties of the softened first polymeric composition, so as to reduce pull out of the first reinforcement fibre from the softened polymeric composition.

In one example, depositing the filament in the first arc comprises depositing the filament in the first arc having a radius in a range from 0.1D to 100D, preferably in a range from 0.5D to 50D, more preferably in a range from 1D to 25D, wherein D is the diameter of the filament. That is, the radius of the first arc is relatively tight compared with the diameter of the filament.

In one example, depositing the filament in the first arc comprises depositing the filament in the first arc having a radius in a range from 10d to 100,000d, preferably in a range from 100d to 50,000d, more preferably in a range from 500d to 25,000d, wherein d is the diameter of the first reinforcement fibre. That is, the radius of the first arc is relatively tight compared with the diameter of the first reinforcement fibre.

In one example, depositing the filament in the first arc comprises depositing the filament in the first arc having a radius in a range from 0.1 mm to 100 mm, preferably in a range from 0.25 mm to 50 mm, more preferably in a range from 0.5 mm to 20 mm. That is, the radius of the first arc is relatively tight compared with a scale of conventional FFF.

In one example, providing the filament comprises providing the filament on a spool and wherein the method comprises feeding the filament from the spool. In this way, the first discontinuity is formed in situ (i.e. inline), during FFM. In one example, the method comprises forming the first discontinuity of the first set of discontinuities in the first reinforcement fibre in situ during the FFM. For example, the filament may be provided from a conventional filament comprising reinforcement fibres by forming the first discontinuity of the first set of discontinuities in the first reinforcement fibre in situ in the conventional filament, as described with respect to the first aspect. That is, the discontinuities may be formed inline, during the FFF.

In one example, forming the first discontinuity of the first set of discontinuities in the first reinforcement fibre comprises forming the first discontinuity in the first reinforcement fibre while feeding the filament from the spool. As understood by the skilled person, FFM is typically a continuous process and hence the first discontinuity is formed during this continuous process.

In one example, forming the first discontinuity comprises transversely parting, at least in part, the first reinforcement fibre, for example as described with respect to the first aspect.

In one example, forming the first discontinuity comprises laser ablating, cutting, punching and/or water jetting, at least in part, the first reinforcement fibre, for example as described with respect to the first aspect.

In one example, the first set of reinforcement fibres includes a second reinforcement fibre and wherein the method comprises forming a first discontinuity of a second set of discontinuities in the second reinforcement fibre, wherein the first discontinuity of the first set of discontinuities and the first discontinuity of the second set of discontinuities are mutually spaced apart axially, for example as described with respect to the first aspect.

In one example, a volume fraction of the first set of reinforcement fibres is in a range from 10% to 70%, preferably in a range from 20% to 65%, for example 30%, 40% or 50%, by volume of the filament, for example as described with respect to the first aspect In one example, the method comprises forming a second discontinuity of the first set of discontinuities in the first reinforcement fibre, wherein the first discontinuity of the first set of discontinuities and the second discontinuity of the first set of discontinuities are mutually spaced apart axially. That is, the first reinforcement includes two (i.e. a plurality) of discontinuities. In one example, respective positions of the first discontinuity and the second discontinuity correspond with the first arc. That is, the first discontinuity and the second discontinuity are included in the same arc. In this way, a mechanical property, for example a strength and/or a stiffness, of the first reinforcement fibre, may be further reduced, thereby enabling the first reinforcement fibre to be deposited in a relatively tighter arc (i.e. relatively smaller radius) compared with a continuous (i.e. uniform, constant cross-section, intact) first reinforcement fibre. In one example, respective positions of the first discontinuity and the second discontinuity correspond with the first arc and a second arc of the set of arcs, respectively. That is, the first discontinuity and the second discontinuity are included in different arcs. In this way, the filament may be deposited in a plurality of arcs to fabricate a relatively complex article.

In one example, forming the first discontinuity of the first set of discontinuities in the first reinforcement fibre comprises forming the first discontinuity of the first set of discontinuities in the first reinforcement fibre in a first portion (i.e. length) of a set of portions of the filament and depositing the filament, including the first discontinuity of the first set of discontinuities formed in the first reinforcement fibre, in the first arc of the set of arcs comprises depositing the first portion of the filament, including the first discontinuity of the first set of discontinuities formed in the first reinforcement fibre, in the first arc of the set of arcs. In other words, the first discontinuity is formed in the first reinforcement fibre in the first portion of the filament and the first portion of the filament, including the first discontinuity formed in the first reinforcement fibre therein, is deposited in the arc. That is, a position of the first discontinuity is included in the first arc.

In one example, the method comprises forming a second discontinuity of the first set of discontinuities in the first reinforcement fibre in a second portion (i.e. length) of the set of portions of the filament, wherein the first portion and the second portion are mutually adjacent axially and/or mutually spaced apart axially, for example by other portions therebetween. That is, two discontinuities (i.e. the first discontinuity and the second discontinuity) are formed in the first fibre. The first discontinuity and the second discontinuity may be as described with respect to the first aspect. In one example, the method comprises forming a first discontinuity of a second set of discontinuities in a second reinforcement fibre in a second portion (i.e. length) of the set of portions of the filament, wherein the first portion and the second portion are mutually adjacent axially and/or mutually spaced apart axially, for example by other portions therebetween. That is, two discontinuities (i.e. the first discontinuity and the second discontinuity) are formed in the are formed in the filament, in the first fibre and in the second fibre, respectively. The first discontinuity of the first set of discontinuities and the first discontinuity of the second set of discontinuities may be as described with respect to the first aspect. More generally, in one example, forming the first discontinuity of the first set of discontinuities in the first reinforcement fibre comprises forming the first discontinuity of the first set of discontinuities in the first reinforcement fibre in a first portion (i.e. length) of a set of portions of the filament and forming another discontinuity in the first reinforcement fibre or in a second reinforcement fibre in a second portion (i.e. length) of the set of portions of the filament, wherein the first portion and the second portion are mutually adjacent axially and/or mutually spaced apart axially, for example by other portions therebetween. That is, two discontinuities are formed, in the first portion and in the second portion, respectively.

In one example, forming the first discontinuity of the first set of discontinuities in the first reinforcement fibre comprises forming the first discontinuity of the first set of discontinuities in the first reinforcement fibre in a first portion (i.e. length) of a set of portions of the filament and depositing the filament, including the first discontinuity of the first set of discontinuities formed in the first reinforcement fibre, in the first arc of the set of arcs comprises depositing the first portion of the filament, including the first discontinuity of the first set of discontinuities formed in the first reinforcement fibre, in the first arc of the set of arcs, while (i.e. simultaneously) forming a second discontinuity of the first set of discontinuities in the first reinforcement fibre in a second portion (i.e. length) of the set of portions of the filament and/or forming a first discontinuity of a second set of discontinuities in a second reinforcement fibre in a second portion (i.e. length) of the set of portions, wherein the first portion and the second portion are mutually adjacent axially and/or mutually spaced apart axially, for example by other portions therebetween. That is, a discontinuity is formed in the second portion while the first portion is deposited. In other words, forming the discontinuities is inline (i.e. in situ) with FFF.

In one example, forming the first discontinuity of the first set of discontinuities in the first reinforcement fibre and depositing the filament, including the first discontinuity of the first set of discontinuities formed in the first reinforcement fibre are successive. In other words, the first discontinuity is formed and then the filament is subsequently deposited, for example while feeding the filament from a spool. In this way, discontinuities may be formed as predicted to be required, so as to prevent pull out.

In one example, forming the first discontinuity of the first set of discontinuities in the first reinforcement fibre and depositing the filament, including the first discontinuity of the first set of discontinuities formed in the first reinforcement fibre are simultaneous. In other words, the first discontinuity is formed while the filament is being deposited. In this way, the first discontinuity may be formed at a position responsive to a radius of the first arc, for example. In other words, discontinuities may be formed as required, for example so as to prevent pull out and/or if pull out is sensed.

In one example, forming the first discontinuity of the first set of discontinuities in the first reinforcement fibre comprises forming the first discontinuity at a first predetermined position in the first reinforcement fibre corresponding to the first arc. In one example, the first predetermined position is determined from a STL file, for example according to a radius of curvature of the first arc, mechanical properties of the first reinforcement fibre and/or the set of reinforcement fibres, mechanical properties of the first polymeric composition and/or mechanical properties of the filament. The mechanical properties of the first polymeric composition are changed during softening and hence the first predetermined positions and/or respective positions of the set of discontinuities may be calculated, at least in part, according to the mechanical properties of the softened first polymeric composition, so as to reduce pull out of the first reinforcement fibre from the softened polymeric composition.

In one example, the first discontinuity of the first set of discontinuities and the second discontinuity of the first set of discontinuities are mutually spaced apart axially by a spacing determined, at least in part, according to a radius of the first arc. In this way, a mechanical property a mechanical property, for example a strength and/or a stiffness, of the first reinforcement fibre, may be reduced according to a curvature of the first reinforcement fibre, due to the radius of the first arc. In other words, discontinuities may be formed at appropriate positions so as to prevent pull out of the first fibre depending on the radius of the first arc. Generally, relatively smaller radii of curvature of the first reinforcement fibre require relatively more closely spaced discontinuities, compared with relatively larger radii of curvature of the first reinforcement fibre, so as to prevent pull out, for a given fibre. In one example, the first discontinuity of the first set of discontinuities and the second discontinuity of the first set of discontinuities are mutually spaced apart axially by a spacing determined, at least in part, according to a radius of the first arc, a diameter of the first reinforcement fibre, a mechanical property, for example a strength and/or a stiffness, of the first fibre, and/or a mechanical property, for example a strength and/or a viscosity, of the first polymeric composition, for example of the softened first polymeric composition.

In one example, forming the second discontinuity of the first set of discontinuities in the first reinforcement fibre comprises forming the second discontinuity of the first set of discontinuities in the first reinforcement fibre while depositing the filament, including the first discontinuity of the first set of discontinuities formed in the first reinforcement fibre. That is, forming discontinuities is inline with the depositing.

In one example, respective positions of the first set of discontinuities, for example arranged in staggered positions, correspond with the arc to be deposited during FFF, for example as determined from a STL file, as described with respect to the first aspect.

In one example, softening, at least in part, the first polymeric composition comprises melting, at least in part, the first polymeric composition, for example comprising a first thermoplastic, as described with respect to the first aspect.

In one example, solidifying the softened first polymeric composition comprises curing, at least in part, the softened first polymeric composition, as described with respect to the first aspect.

In one example, the article comprises and/or is an aircraft, an aerospace, a land craft or a sea craft component, as described with respect to the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIG. 4 schematically depicts a method of fabricating an article by fused filament fabrication according to an exemplary embodiment;

DETAILED DESCRIPTION OF THE DRAWINGS

Figure 1:
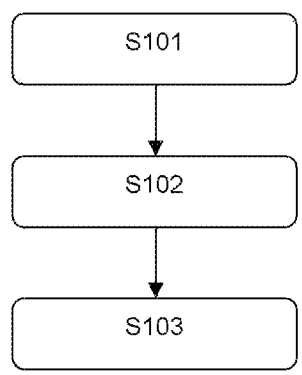
FIG. 1 schematically depicts a method of providing a filament for fused filament fabrication according to an exemplary embodiment.

FIG. 1 schematically depicts a method of providing a filament for fused filament fabrication according to an exemplary embodiment.

At S101, the method comprises arranging a first set of reinforcement fibres, including a first reinforcement fibre.

At S102, the method comprises forming a first discontinuity of a first set of discontinuities in the first reinforcement fibre.

At S103, the method comprises surrounding the first set of reinforcement fibres, at least in part, with a first polymeric composition, thereby providing the filament.

The method may include any of the steps described with respect to the first aspect.

Figure 2:
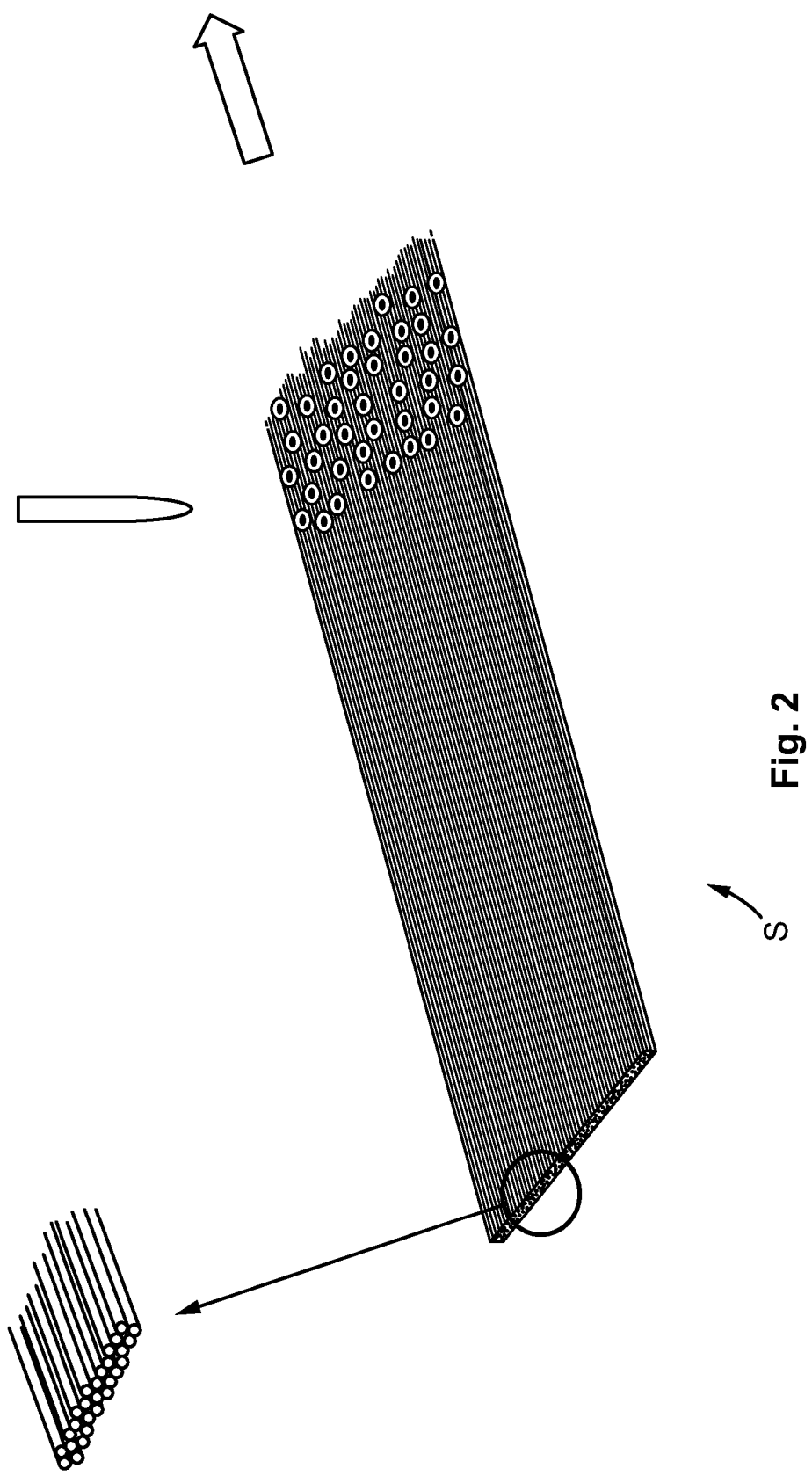
FIG. 2 schematically depicts a method of providing a filament for fused filament fabrication according to an exemplary embodiment, in more detail.

FIG. 2 schematically depicts a method of providing a filament 1 (not shown) for fused filament fabrication according to an exemplary embodiment, in more detail.

In this example, the method comprises arranging a first set RF of reinforcement fibres 100, including a first reinforcement fibre 100A;

forming a first discontinuity 110A of a first set D1 of discontinuities 110 in the first reinforcement fibre 100A; and surrounding the first set RF of reinforcement fibres 100, at least in part, with a first polymeric composition 10 (not shown), thereby providing the filament 1.

In this example, the method comprises surrounding the first set RF of reinforcement fibres 100, at least in part, with the first polymeric composition 10 after forming the first discontinuity 110A of the first set D1 of discontinuities 110 in the first reinforcement fibre 100A.

In this example, the first set RF of reinforcement fibres 100 comprises carbon fibres particularly aerospace grade IM7, having a diameter in a range from 7 μm to 10 μm. In this example, the first reinforcement fibre 100A comprises and/or is a continuous fibre.

In this example, a volume fraction $V_f$ of the first set RF of reinforcement fibres 100 is about 40% by volume of the filament 1. In this example, a volume fraction $V_{f,pristine}$ of pristine fibres of the first set RF of reinforcement fibres 100 is about 15% by volume of the filament 1.

In this example, the first set RF of reinforcement fibres 100 includes a second reinforcement fibre 100B and the method comprises forming a first discontinuity 110A of a second set of discontinuities D2 in the second reinforcement fibre 100B, wherein the first discontinuity 110A of the first set D1 of discontinuities 110 and the first discontinuity 110A of the second set of discontinuities D2 are mutually spaced apart axially.

In this example, arranging the first set RF of reinforcement fibres 100 comprises arranging the first set RF of reinforcement fibres 100 in a planar arrangement, particularly as a thin ply, comprising N layers of the reinforcement fibres of the first set RF of reinforcement fibres 100, where N is 3. In this example, a width of the first set RF of reinforcement fibres 100 is about 5 mm. In this example, arranging the first set RF of reinforcement fibres 100 comprises obtaining a pre-impregnated (i.e. a pre-preg) thin ply and dividing the thin ply axially, thereby providing the first set of reinforcement fibres 100.

In this example, forming the first discontinuity 110A comprises transversely parting, at least in part, the first reinforcement fibre 100A, wherein a reduction in cross-sectional area and/or diameter of the first reinforcement fibre 100A is in a range from 10% to 100%.

In this example, forming the first discontinuity 110A comprises laser ablating, at least in part, the first reinforcement fibre 100A.

In this example, forming the first discontinuity 110A of the first set D1 of discontinuities 110 in the first reinforcement fibre 100A comprises providing tapering ends of the first reinforcement fibre 100A at the first discontinuity 110A therein.

In this example, the method comprises forming a second discontinuity 110B of the first set D1 of discontinuities 110 in the first reinforcement fibre 100A, spaced apart axially from the first discontinuity 110A by a spacing L. In this example, the spacing $L > 5l_c$.

In this example, the method comprises rearranging the first set RF of reinforcement fibres 100 before surrounding the first set RF of reinforcement fibres 100, at least in part, with the first polymeric composition 10. In this example, rearranging the first set RF of reinforcement fibres 100 comprises arranging the first set RF of reinforcement fibres 100 in a tubular or a cylindrical arrangement.

In this example, the first thermoplastic is PEKK.

In this example, the method comprises completely surrounding the first set RF of reinforcement fibres 100 with the first polymeric composition 10. In this example, surrounding the first set RF of reinforcement fibres 100, at least in part, with the first polymeric composition 10 is by pultrusion.

Figure 3:
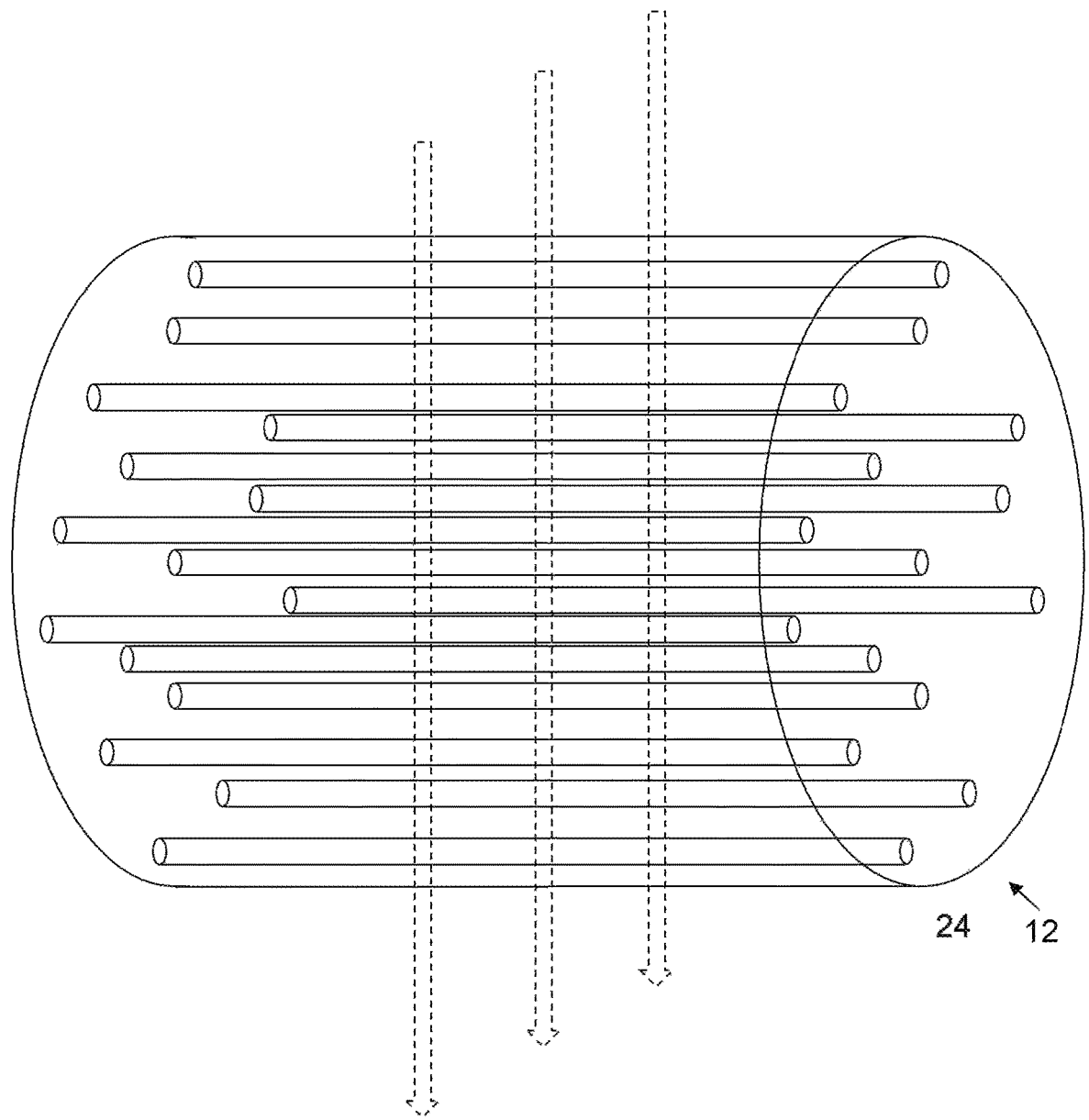
FIG. 3 schematically depicts a method of providing a filament for fused filament fabrication according to an exemplary embodiment, in more detail.

FIG. 3 schematically depicts a method of providing a filament 2 for fused filament fabrication according to an exemplary embodiment, in more detail.

In this example, the method comprises arranging a first set RF of reinforcement fibres 200, including a first reinforcement fibre 200A;
forming a first discontinuity 210A of a first set D1 of discontinuities 210 in the first reinforcement fibre 200A; and
surrounding the first set RF of reinforcement fibres 200, at least in part, with a first polymeric composition 20, thereby providing the filament 2.

In contrast to the example described with respect to FIG. 2, in this example, the method comprises surrounding the first set RF of reinforcement fibres 200, at least in part, with the first polymeric composition 20 before forming the first discontinuity 210A of the first set D1 of discontinuities 210 in the first reinforcement fibre 200A. In this way, the filament 2 may be provided from a conventional filament comprising reinforcement fibres by forming the first discontinuity 210A of the first set D1 of discontinuities 210 in the first reinforcement fibre 200A in situ in the conventional filament.

In this example, the first set RF of reinforcement fibres 200 comprises carbon fibres particularly aerospace grade IM7, having a diameter in a range from 7 µm to 20 µm. In this example, the first reinforcement fibre 200A comprises and/or is a continuous fibre.

In this example, a volume fraction $V_f$ of the first set RF of reinforcement fibres 200 is about 40% by volume of the filament 2. In this example, a volume fraction $V_{f,pristine}$ of pristine fibres of the first set RF of reinforcement fibres 200 is about 25% by volume of the filament 2.

In this example, the first set RF of reinforcement fibres 200 includes a second reinforcement fibre 200B and the method comprises forming a first discontinuity 210A of a second set of discontinuities D2 in the second reinforcement fibre 200B, wherein the first discontinuity 210A of the first set D1 of discontinuities 210 and the first discontinuity 210A of the second set of discontinuities D2 are mutually spaced apart axially.

In this example, forming the first discontinuity 210A comprises transversely parting, at least in part, the first reinforcement fibre 200A, wherein a reduction in cross-sectional area and/or diameter of the first reinforcement fibre 200A is in a range from 20% to 100%.

In this example, forming the first discontinuity 210A comprises laser ablating, at least in part, the first reinforcement fibre 200A.

In this example, forming the first discontinuity 210A of the first set D1 of discontinuities 210 in the first reinforcement fibre 200A comprises providing tapering ends of the first reinforcement fibre 200A at the first discontinuity 210A therein.

In this example, the method comprises forming a second discontinuity 210B of the first set D1 of discontinuities 210 in the first reinforcement fibre 200A, spaced apart axially from the first discontinuity 210A by a spacing L. In this example, the spacing $L > 5l_c$.

In this example, the first thermoplastic is PEKK.

In this example, the method comprises completely surrounding the first set RF of reinforcement fibres 200 with the first polymeric composition 20. In this example, surrounding the first set RF of reinforcement fibres 200, at least in part, with the first polymeric composition 20 is by pultrusion.

FIG. 4 schematically depicts a method of fabricating an article by fused filament fabrication, using a filament provided according to the first aspect and/or according to the second aspect, according to an exemplary embodiment.

At S401, the method comprises depositing the filament comprising softening, at least in part, the first polymeric composition and solidifying the softened first polymeric composition;
wherein depositing the filament comprises depositing the filament in an arc having a radius in a range from 0.5 mm to 20 mm.

Figure 5:
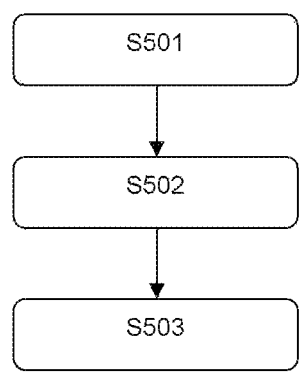
FIG. 5 schematically depicts a method of fabricating an article by fused filament fabrication according to an exemplary embodiment.

FIG. 5 schematically depicts a method of fabricating an article by fused filament fabrication according to an exemplary embodiment.

At S501, a filament comprising a first set of reinforcement fibres, including a first reinforcement fibre, surrounded, at least in part, with a first polymeric composition, is provided.

At S502, a first discontinuity of a first set of discontinuities is formed in the first reinforcement fibre.

At S503, the filament, including the first discontinuity of the first set of discontinuities formed in the first reinforcement fibre, is deposited, comprising softening, at least in part, the first polymeric composition and solidifying the softened first polymeric composition.

Depositing the filament, including the first discontinuity of the first set of discontinuities formed in the first reinforcement fibre, comprises depositing the filament, including the first discontinuity of the first set of discontinuities formed in the first reinforcement fibre, in a first arc of a set of arcs.

The method may include any of the steps described with respect to the seventh aspect.

Figure 6:
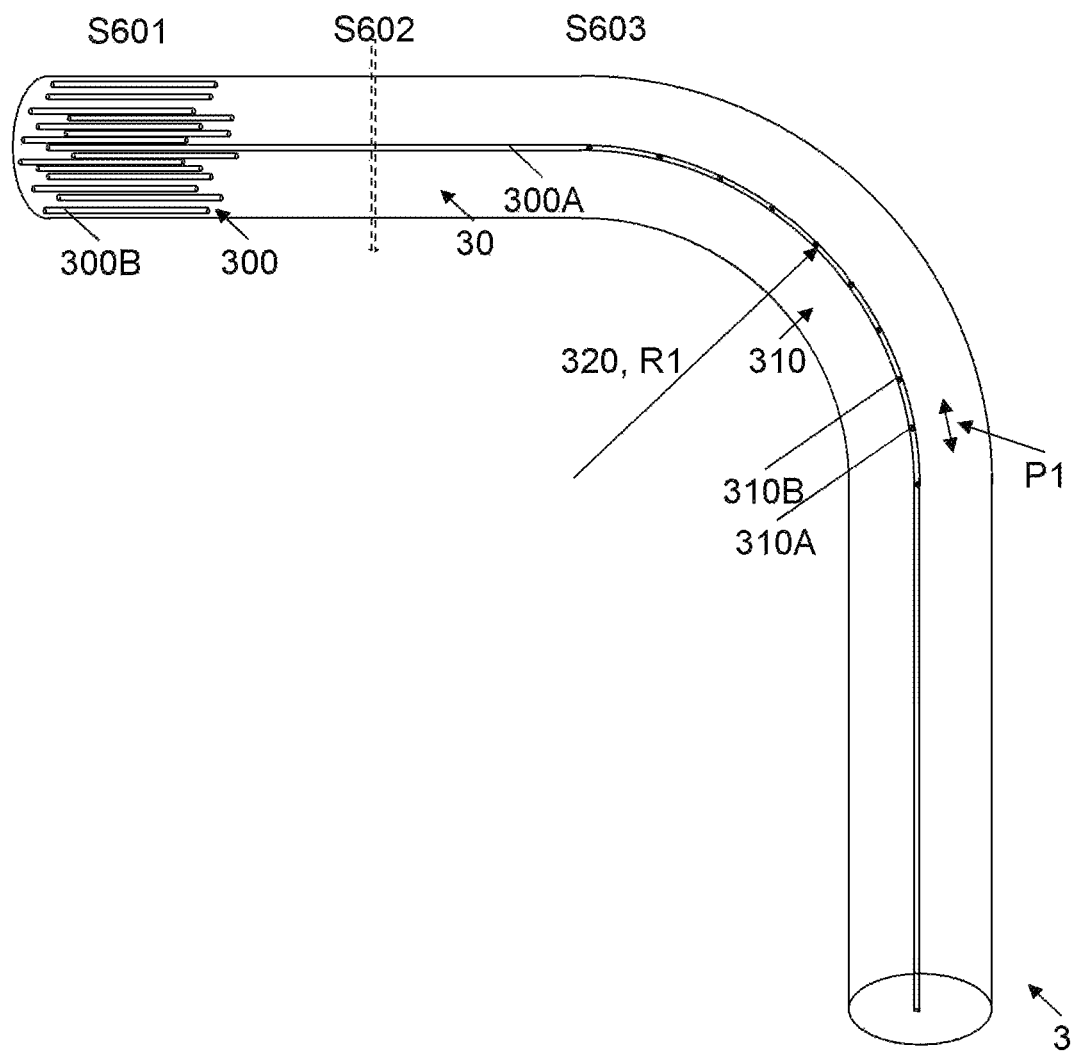
FIG. 6 schematically depicts a method of fabricating an article by fused filament fabrication according to an exemplary embodiment.

FIG. 6 schematically depicts the method of fabricating an article by fused filament fabrication according to an exemplary embodiment.

Particularly, FIG. 6 schematically depicts the method of fabricating an article by FFF, generally as described with respect to FIG. 5, in more detail.

In this example, the method comprises providing a filament 3 comprising a first set RF of reinforcement fibres 300, including a first reinforcement fibre 300A, surrounded, at least in part, with a first polymeric composition 30;

forming a first discontinuity 310A of a first set D1 of discontinuities 310 in the first reinforcement fibre 300A; and depositing the filament 3, including the first discontinuity 310A of the first set D1 of discontinuities 310 formed in the first reinforcement fibre 300A, comprising softening, at least in part, the first polymeric composition 30 and solidifying the softened first polymeric composition 30;

wherein depositing the filament 3, including the first discontinuity 310A of the first set D1 of discontinuities 310 formed in the first reinforcement fibre 300A, comprises depositing the filament 30, including the first discontinuity 310A of the first set D1 of discontinuities 310 formed in the first reinforcement fibre 300A, in a first arc 320 of a set of arcs A.

For clarity, only the first reinforcement fibre 300A is shown in FIG. 6 extending along the length of the filament 3 while only an initial section of the remaining first set RF of reinforcement fibres 300 is shown.

In this example, forming the first discontinuity 310A of the first set D1 of discontinuities 310 in the first reinforcement fibre 300A comprises forming the first discontinuity 310A of the first set D1 of discontinuities 310 in the first reinforcement fibre 300A in a first portion 330A (i.e. length) of a set P of portions 330 of the filament 3 and depositing the filament 3, including the first discontinuity 310A of the first set D1 of discontinuities 310 formed in the first reinforcement fibre 300A, in the first arc 320 of the set of arcs A comprises depositing the first portion P1 of the filament 3, including the first discontinuity 310A of the first set D1 of discontinuities 310 formed in the first reinforcement fibre 300A, in the first arc 320 of the set of arcs A.

In this example, forming the first discontinuity 310A of the first set D1 of discontinuities 310 in the first reinforcement fibre 300A comprises forming the first discontinuity 310A at a first predetermined position in the first reinforcement fibre 300A corresponding to the first arc 320. In this example, the first predetermined position is determined from a STL file, for example according to a radius of curvature of the first arc 320, mechanical properties of the first reinforcement fibre 300A and/or the set of reinforcement fibres, mechanical properties of the first polymeric composition 30 and/or mechanical properties of the filament 3

In this example, depositing the filament 3 in the first arc 320 comprises depositing the filament 3 in the first arc 320 having a radius in a range from 0.25 mm to 50 mm In this example, providing the filament 3 comprises providing the filament 3 on a spool and wherein the method comprises feeding the filament 3 from the spool.

In this example, the method comprises forming the first discontinuity 310A of the first set D1 of discontinuities 310 in the first reinforcement fibre 300A in situ during the FFM.

In this example, forming the first discontinuity 310A of the first set D1 of discontinuities 310 in the first reinforcement fibre 300A comprises forming the first discontinuity 310A in the first reinforcement fibre 300A while feeding the filament 3 from the spool.

In this example, forming the first discontinuity 310A comprises transversely parting, at least in part, the first reinforcement fibre 300A, for example as described with respect to the first aspect.

In this example, forming the first discontinuity 310A comprises laser ablating, at least in part, the first reinforcement fibre 300A, for example as described with respect to the first aspect.

In this example, the first set RF of reinforcement fibres 300 includes a second reinforcement 300B fibre and wherein the method comprises forming a first discontinuity 311A (not shown) of a second set D2 of discontinuities 311 (not shown) in the second reinforcement fibre 300B, wherein the first discontinuity 310A of the first set D1 of discontinuities 310 and the first discontinuity 310A of the second set D3 of discontinuities 311 are mutually spaced apart axially, for example as described with respect to the first aspect.

In this example, the method comprises forming a second discontinuity 310B of the first set D1 of discontinuities 310 in the first reinforcement fibre 300A, wherein the first discontinuity 310A of the first set D1 of discontinuities 310 and the second discontinuity 310B of the first set D1 of discontinuities 310 are mutually spaced apart axially. In this example, respective positions of the first discontinuity 310A and the second discontinuity 3108 correspond with the first arc 320.

In this example, forming the first discontinuity 310A of the first set D1 of discontinuities 310 in the first reinforcement fibre 300A comprises forming the first discontinuity 310A of the first set D1 of discontinuities 310 in the first reinforcement fibre 300A in a first portion P1 (i.e. length) of a set of portions P of the filament 3 and depositing the filament 3, including the first discontinuity 310A of the first set D1 of discontinuities 310 formed in the first reinforcement fibre 300A, in the first arc 320 of the set of arcs A comprises depositing the first portion P1 of the filament 3, including the first discontinuity 310A of the first set D1 of discontinuities 310 formed in the first reinforcement fibre 300A, in the first arc 320 of the set of arcs A.

In this example, the method comprises forming a second discontinuity 310B of the first set D1 of discontinuities 310 in the first reinforcement fibre 300A in a second portion P2 (i.e. length) of the set of portions P of the filament 3, wherein the first portion and the second portion are mutually adjacent axially and/or mutually spaced apart axially, for example by other portions therebetween.

In this example, forming the first discontinuity 310A of the first set D1 of discontinuities 310 in the first reinforcement fibre 300A comprises forming the first discontinuity 310A of the first set D1 of discontinuities 310 in the first reinforcement fibre 300A in a first portion P1 (i.e. length) of a set of portions P of the filament 3 and depositing the filament 3, including the first discontinuity 310A of the first set D1 of discontinuities 310 formed in the first reinforcement fibre 300A, in the first arc 320 of the set of arcs A comprises depositing the first portion of the filament 3, including the first discontinuity 310A of the first set D1 of discontinuities 310 formed in the first reinforcement fibre 300A, in the first arc 320 of the set of arcs A, while (i.e. simultaneously) forming a second discontinuity 310B of the first set D1 of discontinuities 310 in the first reinforcement fibre 300A in a second portion P2 (i.e. length) of the set of portions of the filament 3 and/or forming a first discontinuity 310A of a second set of discontinuities in a second reinforcement fibre in a second portion (i.e. length) of the set of portions, wherein the first portion and the second portion are mutually adjacent axially and/or mutually spaced apart axially, for example by other portions therebetween.

In this example, forming the first discontinuity 310A of the first set D1 of discontinuities 310 in the first reinforcement fibre 300A and depositing the filament 3, including the first discontinuity 310A of the first set D1 of discontinuities 310 formed in the first reinforcement fibre 300A are successive.

In this example, forming the first discontinuity 310A of the first set D1 of discontinuities 310 in the first reinforcement fibre 300A comprises forming the first discontinuity 310A at a first predetermined position in the first reinforcement fibre 300A corresponding to the first arc 320. In this example, the first predetermined position is determined from a STL file, for example according to a radius of curvature of the first arc 320, mechanical properties of the first reinforcement fibre 300A and/or the set of reinforcement fibres, mechanical properties of the first polymeric composition 30 and/or mechanical properties of the filament 3.

In this example, the first discontinuity 310A of the first set D1 of discontinuities 310 and the second discontinuity 3108 of the first set D1 of discontinuities 310 are mutually spaced apart axially by a spacing determined, at least in part, according to a radius of the first arc 320. In this example, the first discontinuity 310A of the first set D1 of discontinuities 310 and the second discontinuity of the first set D1 of discontinuities 310 are mutually spaced apart axially by a spacing determined, at least in part, according to a radius of the first arc 320, a diameter of the first reinforcement fibre 300A, a mechanical property, for example a strength and/or a stiffness, of the first fibre, and/or a mechanical property, for example a strength and/or a viscosity, of the first polymeric composition 30, for example of the softened first polymeric composition 30.

In this example, forming the second discontinuity 310B of the first set D1 of discontinuities 310 in the first reinforcement fibre 300A comprises forming the second discontinuity 310B of the first set D1 of discontinuities 310 in the first reinforcement fibre 300A while depositing the filament 3, including the first discontinuity 310A of the first set D1 of discontinuities 310 formed in the first reinforcement fibre 300A. That is, forming discontinuities is inline with the depositing.

In this example, respective positions of the first set D1 of discontinuities 310, for example arranged in staggered positions, correspond with the arc to be deposited during FFF, for example as determined from a STL file, as described with respect to the first aspect.

In this example, softening, at least in part, the first polymeric composition 30 comprises melting, at least in part, the first polymeric composition 30, for example comprising a first thermoplastic, as described with respect to the first aspect.

In this example, solidifying the softened first polymeric composition 30 comprises curing, at least in part, the softened first polymeric composition 30, as described with respect to the first aspect.

In this example, the article comprises and/or is an aircraft, an aerospace, a land craft or a sea craft component, as described with respect to the first aspect.

In this example, the first set RF of reinforcement fibres 300 comprises carbon fibres particularly aerospace grade IM7, having a diameter in a range from 7 μm to 30 μm. In this example, the first reinforcement fibre 300A comprises and/or is a continuous fibre.

In this example, a volume fraction $V_f$ of the first set RF of reinforcement fibres 300 is about 40% by volume of the filament 3. In this example, a volume fraction $V_{f,pristine}$ of pristine fibres of the first set RF of reinforcement fibres 300 is about 35% by volume of the filament 3.

In this example, the first set RF of reinforcement fibres 300 includes a second reinforcement fibre 300B and the method comprises forming a first discontinuity 310A of a second set of discontinuities D2 in the second reinforcement fibre 300B, wherein the first discontinuity 310A of the first set D1 of discontinuities 310 and the first discontinuity 310A of the second set of discontinuities D2 are mutually spaced apart axially.

In this example, forming the first discontinuity 310A comprises transversely parting, at least in part, the first reinforcement fibre 300A, wherein a reduction in cross-sectional area and/or diameter of the first reinforcement fibre 300A is in a range from 30% to 100%.

In this example, forming the first discontinuity 310A comprises laser ablating, at least in part, the first reinforcement fibre 300A.

In this example, forming the first discontinuity 310A of the first set D1 of discontinuities 310 in the first reinforcement fibre 300A comprises providing tapering ends of the first reinforcement fibre 300A at the first discontinuity 310A therein.

In this example, the method comprises forming a second discontinuity 310B of the first set D1 of discontinuities 310 in the first reinforcement fibre 300A, spaced apart axially from the first discontinuity 310A by a spacing L. In this example, the spacing $L > 5l_c$.

In this example, the first thermoplastic is PEKK.

In this example, the method comprises completely surrounding the first set RF of reinforcement fibres 300 with the first polymeric composition 30. In this example, surrounding the first set RF of reinforcement fibres 300, at least in part, with the first polymeric composition 30 is by pultrusion.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

What is claimed is:

1. A method of fabricating an article by fused filament fabrication, the method comprising:
   providing a FFF filament comprising a first set of reinforcement fibres, including a first reinforcement fibre, surrounded, at least in part, with a first polymeric composition;
   forming a first discontinuity of a first set of discontinuities in the first reinforcement fibre; and
   depositing the filament, including the first discontinuity of the first set of discontinuities formed in the first reinforcement fibre, comprising softening, at least in part, the first polymeric composition and solidifying the softened first polymeric composition;
   wherein depositing the filament, including the first discontinuity of the first set of discontinuities formed in the first reinforcement fibre, comprises depositing the filament, including the first discontinuity of the first set of discontinuities formed in the first reinforcement fibre, in a first arc of a set of arcs;
   wherein the first discontinuity of the first set of discontinuities in the first reinforcement fibre is a partial discontinuity at which the cross sectional area and/or diameter of the first reinforcement fibre is reduced by a percentage that is in a range from 10% to 90%; and
   wherein the method comprises surrounding the first set of reinforcement fibres, at least in part, with the first polymeric composition after forming the first discontinuity of the first set of discontinuities in the first reinforcement fibre.

2. The method according to claim 1, wherein forming the first discontinuity of the first set of discontinuities in the first reinforcement fibre comprises forming the first discontinuity at a first predetermined position in the first reinforcement fibre corresponding to the first arc.

3. The method according to claim 1, wherein depositing the filament in the first arc comprises depositing the filament in the first arc having a radius in a range from 0.1D to 100D, wherein D is the diameter of the filament.

4. The method according to claim 1, wherein depositing the filament in the first arc comprises depositing the filament in the first arc having a radius in a range from 0.1 mm to 100 mm.

5. The method according to claim 1, wherein providing the filament comprises providing the filament on a spool and wherein the method comprises feeding the filament from the spool.

6. The method according to claim 1, wherein forming the first discontinuity comprises transversely parting, at least in part, the first reinforcement fibre.

7. The method according to claim 1, wherein forming the first discontinuity comprises laser ablating, cutting, punching and/or water jetting, at least in part, the first reinforcement fibre.

8. The method according to claim 1, wherein the first set of reinforcement fibres includes a second reinforcement fibre and wherein the method comprises forming a first discontinuity of a second set of discontinuities in the second reinforcement fibre, wherein the first discontinuity of the first set of discontinuities and the first discontinuity of the second set of discontinuities are mutually spaced apart axially.

9. The method according to claim 1, wherein a volume fraction of the first set of reinforcement fibres is in a range from 10% to 70% by volume of the filament.

10. The method according to claim 1, comprising forming a second discontinuity of the first set of discontinuities in the first reinforcement fibre, wherein the first discontinuity of the first set of discontinuities and the second discontinuity of the first set of discontinuities are mutually spaced apart axially.

11. The method according to claim 10, wherein the first discontinuity of the first set of discontinuities and the second discontinuity of the first set of discontinuities are mutually spaced apart axially by a spacing determined, at least in part, according to a radius of the first arc.

12. The method according to claim 10, wherein forming the second discontinuity of the first set of discontinuities in the first reinforcement fibre comprises forming the second discontinuity of the first set of discontinuities in the first reinforcement fibre while depositing the filament, including the first discontinuity of the first set of discontinuities formed in the first reinforcement fibre.

13. The method according to claim 3, wherein depositing the filament in the first arc comprises depositing the filament in the first arc having a radius in a range from 0.5D to 50D.

14. The method according to claim 3, wherein depositing the filament in the first arc comprises depositing the filament in the first arc having a radius in a range from 1D to 25D.

15. The method according to claim 4, wherein depositing the filament in the first arc comprises depositing the filament in the first arc having a radius in a range from 0.25 mm to 50 mm.

16. The method according to claim 4, wherein depositing the filament in the first arc comprises depositing the filament in the first arc having a radius in a range from 0.5 mm to 20 mm.

17. The method according to claim 9, wherein a volume fraction of the first set of reinforcement fibres is in a range from 20% to 65% by volume of the filament.

* * * * *